Figure 1:
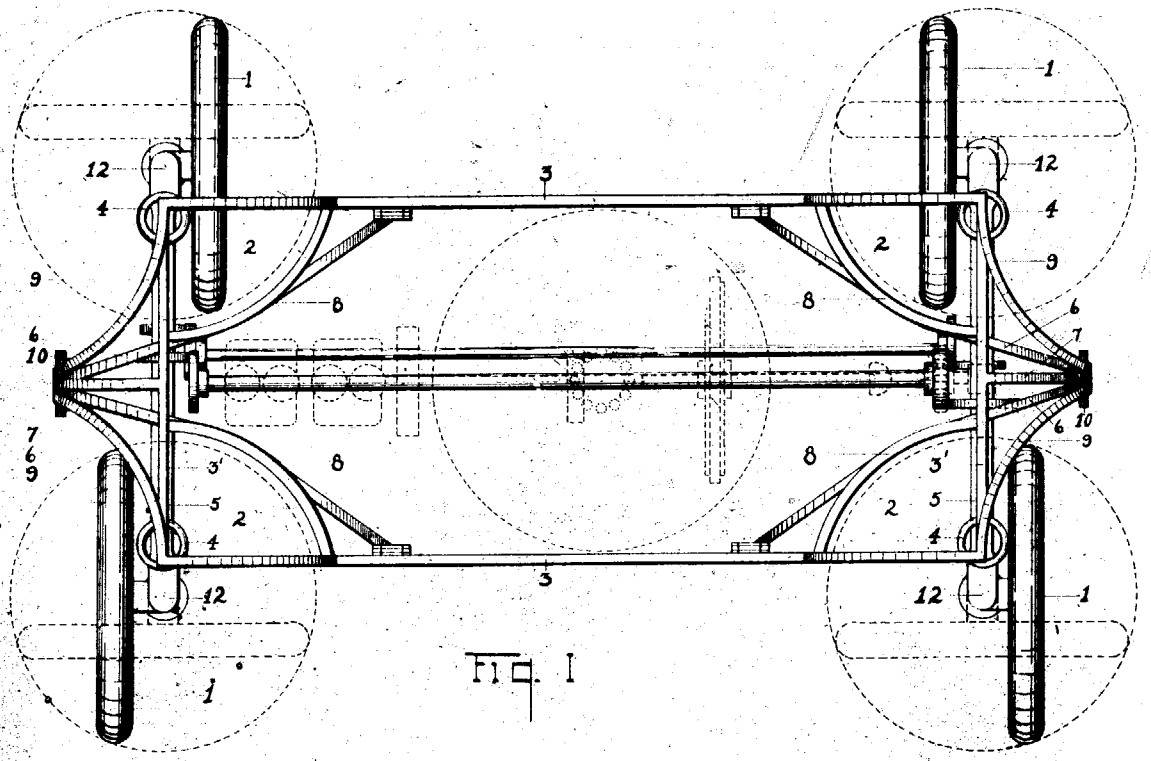

C. B. STEELE.

MOTOR VEHICLE.

APPLICATION FILED DEC. 24, 1918.

Reissued Dec. 9, 1919.

14,768.

2 SHEETS—SHEET 1.

INVENTOR.
Charles Brewster Steele
BY E. B. Whiteman
ATTORNEY.

C. B. STEELE.
MOTOR VEHICLE.
APPLICATION FILED DEC. 24, 1918.
Reissued Dec. 9, 1919.
14,768.
2 SHEETS—SHEET 2.
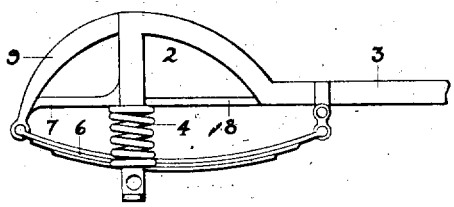
FIG. II.
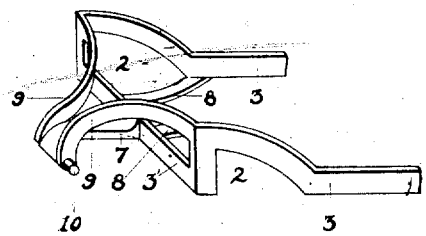
FIG. III.
INVENTOR.
Charles Brewster Steele
BY E. B. Whitcomb
ATTORNEY

REISSUED

UNITED STATES PATENT OFFICE.

CHARLES B. STEELE, OF PHILADELPHIA, PENNSYLVANIA, ASSIGNOR, BY MESNE ASSIGNMENTS, TO E. B. WHITCOMB, OF WASHINGTON, DISTRICT OF COLUMBIA.

MOTOR-VEHICLE.

14,768. Specification of Reissued Letters Patent. Reissued Dec. 9, 1919.

Original No. 1,214,968, dated February 6, 1917, Serial No. 368,806, filed April 18, 1907. Application for reissue filed December 24, 1918. Serial No. 268,177.

DIVISION A.

*To all whom it may concern:*

Be it known that I, CHARLES B. STEELE, a citizen of the United States, and a resident of the city of Philadelphia, in the county of Philadelphia and State of Pennsylvania, have invented certain new and useful Improvements in Motor-Vehicles, of which the following is a specification, this being a divisional reissue of Patent No. 1,214,968.

My invention relates to a vehicle, including a frame and spring suspension, of which the following is a description, and which is illustrated in the drawings wherein Figure 1 is a plan of the vehicle; Fig. 2 is a side elevation of one end of the frame and showing the relation of the tie springs 6 also showing cushioning springs 4; Fig. 3 is a perspective view of one end of the frame chassis.

My invention may be used, if desired, with a four-wheel drive construction in which the wheels may be turned sharply through an angle of 180° to facilitate steering and running the vehicle, but it is not limited thereto, and the frame and suspension may be used with any type of vehicle.

The frame or chassis consists of two substantially parallel side beams 3, preferably extending upwardly, longitudinally, and downwardly, at each end forming ports, or recesses 2, for the reception of the supporting wheels 1, when used with a vehicle in which the wheels are turned at right angles to their normal running position. The downward projecting parts of the frame are connected by end beams 3′. Rigid braces 8 are attached to the side beams 3, and being bowed inwardly around the wheel ports 2, are secured at their opposite ends to the end beams 3′. Secured to the upwardly and longitudinally extending portion of the frame are braces or extensions 9, which are shown as curved inwardly and downwardly, and attached at their opposite ends to a rigid projecting arm 7 by a strong bolt or rod 10.

At each end of the axle-trees 5, near the turn-knuckles 12, may be secured springs, cushioning devices, or shock absorbers 4, upon which rest the ends of the end beams 3′, secured thereto. Rigidly secured to the axle-trees 5 are semi-elliptical leaf springs 6, the outward ends of which are attached to the projecting end of the frame, and the inward ends of which are secured to the side beams 3. These springs may bow downwardly, and may also be bowed inwardly, in a lateral direction, similarly to the braces 8, in order to permit the supporting wheels 1 to enter the wheel ports 2 when turned at right angles to the longitudinal axis of the vehicle. These springs 6 also perform the function of flexible strut-rods to prevent the overreaching of the frame, or chassis, as well as the ordinary function of a supporting spring, which would also be accomplished were the outward portion of the springs, extending from axle tree, 5, to the brace arm 7, dispensed with.

What I claim as new and desire to secure by Letters Patent, is:

1. A vehicle provided with an axletree, a frame consisting of parallel longitudinal side beams bowed upwardly and over said axletree, the ends of said bowed extensions being provided with downwardly extending projections and connected to each other by a rigid beam, said frame being provided with extensions bowed inwardly and downwardly and rigidly connected to each other, said horizontal beams each being connected to the transverse beam over said axletree by inwardly bowed braces, springs connected to said axletree intermediate their ends, one end of each spring being connected to its respective side beam and the other end of the springs being connected to the outwardly and downwardly extending projections.

2. A vehicle having an axletree, a frame consisting of side beams bowed upwardly at their ends over the axletree and having downwardly projecting posts over the axletree united to the bowed ends of the frame, a transverse end beam united to each post, braces bowed inwardly connecting each side beam with the end beam, an outwardly extending beam connected to the end beam, braces bowed inwardly and downwardly connecting the bows of the side beams with the outwardly extending beam, springs connecting the side beams with the extension beam and fixed to the axletree, and springs between the end beam and the axletree.

3. In a vehicle, the combination of a frame, front and rear axles, a pair of springs connected to said front axle and converging forwardly to said frame, means for connecting said springs to said frame, a second pair of springs connected to the rear axle and converging rearwardly to said frame, and means for connecting said last mentioned springs to said frame.

4. In a vehicle, the combination of a frame, front and rear axles, a pair of springs connected to said front axle and converging forwardly and upwardly to said frame, means for connecting said springs to said frame, a second pair of springs connected to the rear axle and converging rearwardly and upwardly to said frame, and means for connecting said last mentioned springs to said frame.

5. In a vehicle having a front and a rear axle, a frame extending beyond said front and rear axles on either end of the longitudinal body portion of said frame, and a spring suspension for said frame having springs connected to said axles and to the extended ends of said frame at the central portion thereof, said springs located at an angle to the longitudinal axis of said frame.

6. In a vehicle, the combination of an axle, a frame having a converging extension beyond said axle, and a spring suspension between said frame and said axle including a pair of springs converging between said axle and said frame extension, each of said springs being connected to said axle and to said converging extension.

7. In a vehicle having an axle, a frame provided with an end extending beyond said axle, and springs interposed between said axle and said frame each secured respectively at one point to said axle and at an end to the frame, said springs converging and being located at an angle to the longitudinal axis of the vehicle.

8. In a vehicle, a frame, a front axle, a pair of converging springs connected to the front axle and at an end to the frame, a rear axle, a pair of converging springs connected to the rear axle and at an end connected to the frame, the distance between the axles being less than the distance between the points of connection of the pairs of springs to the frame.

9. A vehicle provided with an axletree, a frame extending over said axletree, springs interposed between said frame and said axletree, said frame being provided with an extension, a tie connected to said extension and the main body portion of said frame and secured intermediate its connecting ends to said axletree.

10. A vehicle having a body portion frame provided with end beams and side beams, axles, traction wheels mounted upon the axles adapted to propel and guide the vehicle, and springs interposed between the axles and the body portion frame secured respectively to the axles, and the end beams, and the side beams of the body portion.

11. In a vehicle having an axle, a frame provided with an end extending beyond said axle, and springs interposed, between said axle and said frame secured to said axle and said extended end of said frame, said springs being located at an angle to the longitudinal axis of the vehicle whereby said springs operate as flexible strut rods in the manner set forth.

12. In an automotive vehicle having an axle, a frame provided with side members, and extensions beyond said axle, said frame carrying a power plant and vehicle body, the combination therewith of spring means between said axle and said frame one part thereof being connected to said axle and to said frame extension, said part being located at an angle to the extensions of said frame.

13. In a vehicle, the combination of an axle, a frame provided with an end extending beyond said axle, and springs interposed between said axle and said frame, one part thereof connected to said axle, and another part thereof to said extending end of the frame, said springs being located at an angle to the longitudinal axis of the vehicle.

14. In a vehicle, an axle, a frame, said frame having a body portion and an extension connected with the body portion, and a spring suspension therefor including angularly arranged springs, one part of a spring being connected to said axle, and another part of said spring being connected to at least one portion of the frame, said portion being within said extension.

15. In a vehicle, a front axle and a rear axle, a frame having ends extending beyond said front and rear axles and a spring suspension for each end of the frame having angularly arranged portions, a part thereof connected to said axle and another part thereof connected to said frame end extensions centrally thereof.

16. In an automotive vehicle having an axle and a frame carrying a power plant and a vehicle body, the combination therewith of a spring suspension for one end of said frame consisting entirely of a pair of springs located to form a horizontal angle relative to the longitudinal axis of the vehicle, said springs being connected to said axle at one point and at an end to the side of the frame, one of said connections permitting rotational movement only of the spring in operation.

17. In an automotive vehicle having an axle and a frame carrying a power plant and vehicle body, the combination therewith of a spring suspension for one end of said frame comprised entirely of springs located to form a horizontal angle with the sides of the frame, one portion of a spring being connected to said axle, and another portion thereof being connected to the side of the frame adjacent an end thereof.

18. In a vehicle having a front axle, a rear axle, and a frame between said axles having side bar members, a spring suspension for said frame at each end thereof comprising a plurality of angularly arranged springs located at a horizontal angle to the side bar members, each of said springs being connected to an axle and one end of each of said springs being connected to a side bar member, the angularity of the springs at one end of the frame being opposed to that of the corresponding springs at the other end of the frame.

19. In a vehicle, a front axle, a rear axle, and a frame including a pair of side bar members, a spring suspension for said frame, including a pair of springs connected to each of said front and rear axles, the springs of each pair located at an angle to the longitudinal axis of the vehicle, and an end of each of the springs being connected to a side bar member.

20. In a motor vehicle, a front axle, a frame carrying a body and a power plant, said axle and frame arranged and maintained at substantially a 90° angle and a spring suspension connecting said frame to said axle, an end of said spring suspension including a spring connecting a side of the frame to an axle, said spring being located to form a horizontal angle relative to the side of the frame.

21. In an automotive vehicle, an axle, wheels mounted on said axle, a frame and a spring suspension connecting said frame to said axle, said spring suspension comprised entirely of a pair of springs one portion of said springs being connected to said axle, and another portion of said springs being connected to the sides of said frame at one end, said springs being located at an angle to the longitudinal axis of the frame, and said frame and springs being arranged to permit said wheels to turn relative to said axle.

22. In a vehicle, having a front axle, a rear axle, a frame having sides and front and rear converging ends beyond said front and rear axles, and a spring suspension for each end of said frame, having springs connected to an axle and to a converging end of the frame.

23. In a vehicle having an axle, a frame having sides and converging end portions extending beyond said axle, the combination therewith of a spring suspension therefor including spring portions connected to said axle and converging to said converging frame end portions.

24. In a motor vehicle having a front axle, a rear axle, and a frame carrying a power plant and a vehicle body, the combination with said frame, of a spring suspension at each end thereof including springs converging in the general longitudinal plane of the frame and connected to an axle and to said frame at a point, centrally and at the extreme end thereof.

25. In a motor vehicle having a front axle, a rear axle, and a frame carrying a power plant and a vehicle body, in combination with said frame, a spring suspension at each end thereof including springs converging in the general longitudinal plane of the frame between each axle and the frame at a point centrally thereof, the springs at one end being connected to the extreme end of the frame, and the springs at the other end being connected to the extreme other end of the frame.

26. In a vehicle, having a front axle, a rear axle, a frame having a body portion and a front and rear extension beyond said front and rear axles, the combination therewith of a spring suspension for each of said frame extensions including a pair of springs located between and connected to an axle and to said frame extension adjacent to the medial line of the frame, said springs located at a horizontal angle relative to the longitudinal axis of the vehicle.

27. In an automotive vehicle having an axle and a frame extending to said axle, said frame carrying a power plant and a vehicle body the combination therewith of a spring suspension for an end of said frame consisting of a pair of leaf springs of varying leaf lengths located to form a horizontal angle relative to the longitudinal axis of the vehicle, said springs connected to said axle at one point and at an end to the side of the frame adjacent but spaced from the end thereof; one of said connections constituting means permitting oscillatory movement only of the spring in operation.

28. In an automotive vehicle having an axle and a frame having side bar members carrying a power plant and a vehicle body, a spring suspension for an end of said frame consisting of a pair of leaf springs of varying leaf lengths located to form a horizontal and vertical angle relative to the side bar members of the frame, said springs connected to said axle at one point and at an end to the side bars rearwardly of the end of the side bar members, said side bar members extending above and to said axle.

CHARLES B. STEELE.